United States Patent
Guey et al.

(10) Patent No.: US 7,518,257 B2
(45) Date of Patent: Apr. 14, 2009

(54) HYBRID POWER-GENERATING DEVICE

(75) Inventors: Zen-Jey Guey, Hsinchu (TW);
Yun-Yuan Chang, Taipei (TW);
Ching-Huei Wu, Hsinchu (TW)

(73) Assignee: Industrial Techonology Research Institute, Hsinchu (TW)

( * ) Notice: Subject to any disclaimer, the term of this patent is extended or adjusted under 35 U.S.C. 154(b) by 22 days.

(21) Appl. No.: 11/834,878

(22) Filed: Aug. 7, 2007

(65) Prior Publication Data

US 2008/0129050 A1    Jun. 5, 2008

(30) Foreign Application Priority Data

Dec. 1, 2006   (TW) ............................... 95144595 A (51) Int. Cl.
*H02P 9/00* (2006.01)
(52) U.S. Cl. .......................................... 290/44; 307/42
(58) Field of Classification Search ................ 290/44
See application file for complete search history.

(56) References Cited

U.S. PATENT DOCUMENTS

| | | | | |
|---|---|---|---|---|
| 3,942,026 A * | 3/1976 | Carter | ........................ | 290/55 |
| 4,274,010 A * | 6/1981 | Lawson-Tancred | .......... | 290/55 |
| 4,446,376 A * | 5/1984 | Baker | ........................ | 290/44 |
| 4,508,972 A * | 4/1985 | Willmouth | .................... | 290/55 |
| 4,585,950 A * | 4/1986 | Lund | ........................... | 290/44 |
| 4,613,760 A * | 9/1986 | Law | ........................... | 290/1 C |
| 5,365,153 A | 11/1994 | Fujita et al. | | |
| 5,929,538 A * | 7/1999 | O'Sullivan et al. | ............ | 307/66 |
| 6,169,390 B1 * | 1/2001 | Jungreis | ......................... | 322/4 |
| 6,304,002 B1 | 10/2001 | Dehlsen et al. | | |
| 6,608,401 B1 * | 8/2003 | Walter | ......................... | 307/39 |
| 6,624,949 B2 | 9/2003 | Roddy et al. | | |
| 6,707,170 B2 * | 3/2004 | Fukaya | ..................... | 290/40 A |
| 6,767,100 B1 | 7/2004 | Long et al. | | |
| 6,819,576 B2 * | 11/2004 | Johnson, Jr. | ................. | 363/123 |
| 6,931,856 B2 * | 8/2005 | Belokon et al. | ............... | 60/772 |
| 6,943,531 B2 * | 9/2005 | Fukaya | ......................... | 322/10 |
| 7,418,820 B2 * | 9/2008 | Harvey et al. | ................. | 60/487 |
| 7,425,771 B2 * | 9/2008 | Rivas et al. | .................... | 290/44 |
| 2004/0036294 A1 * | 2/2004 | Kishibata et al. | .............. | 290/14 |
| 2005/0056021 A1 * | 3/2005 | Belokon et al. | ............... | 60/772 |

(Continued)

FOREIGN PATENT DOCUMENTS

JP     08322297 A   * 12/1996

(Continued)

*Primary Examiner*—Joseph Waks
(74) *Attorney, Agent, or Firm*—WPAT. P.C.; Justin King (57) ABSTRACT

The present invention relates to a hybrid power-generating device and a power generating method thereof. The hybrid power-generating device is primarily comprised of: a primary electrical generator and an auxiliary electrical generator with different characteristics, both mechanically coupled to a prime while enabling the rated power of the auxiliary electrical generator to be smaller than that of the primary electrical generator; wherein, as the prime is operating at a low rotation speed or at its initial operating stage, the auxiliary electrical generator is enabled to be driven and activated thereby; and as the operating speed of the driver is stabilized and reaches a predetermined value, the primary electrical generator is then being driven and activated thereby. By the aforesaid hybrid power-generating device, not only the overall performance and the stability of power grid are enhanced, but also the operating cost is reduced.

35 Claims, 6 Drawing Sheets

U.S. PATENT DOCUMENTS

| | | | |
|---|---|---|---|
| 2005/0140142 A1* | 6/2005 | Welches et al. | 290/41 |
| 2008/0054647 A1* | 3/2008 | Kumar | 290/40 R |
| 2008/0157594 A1* | 7/2008 | Peterson et al. | 307/10.1 |
| 2008/0191484 A1* | 8/2008 | Okubo et al. | 290/44 |

FOREIGN PATENT DOCUMENTS

| | | |
|---|---|---|
| JP | 9-60575 | 4/1997 |
| WO | WO 2007077002 A2 * | 7/2007 |

* cited by examiner

HYBRID POWER-GENERATING DEVICE

FIELD OF THE INVENTION

The present invention relates to a hybrid power-generating device and a power generating method thereof, and more particularly, to a hybrid power-generating device, being provided with the benefits of a doubly-fed induction generator (DFIG) and a synchronous generator (SG) while using the DFIG as its primary electrical generator and the SG as its auxiliary electrical generator by specifying the rated power of the SG to be no larger than one third of the DFIG, by which not only the overall performance and the stability of power grid are enhanced, but also the operating cost is reduced for adapting the same to be used in various relating fields.

BACKGROUND OF THE INVENTION

Balancing between environment conservation and economic development, the renewable energy conversion device that harnesses natural phenomena, such as wind power, hydro power and solar power, etc., for generating electricity is becoming a focal point of any economy whose every fiber vibrates with the logic of cheap oil and careless pollution. For utilizing the wind energy, most conventional large-sized wind turbines in the world use a so-called three phase asynchronous generator, also called an induction generator (IG) to generate AC electricity. While connecting one such IG directly to an electrical grid, its generator slip is usually within −2% and thus it can be considered as operating at fixed rotation speed. One reason for choosing this type of generator is that it is very reliable, and tends to be comparatively inexpensive. However, for most of the time it can not obtain the optimal efficiency on wind energy conversion and has a transmission system that is easily to be affected by gusty wind, moreover, it requires a set of external capacitors to provide the reactive power for supporting the grid voltage.

As variable speed generators can be freed from the aforesaid shortcomings of fixed speed induction generators, they are generally adopted and used in large-sized MW scale wind energy conversion device. The generators suitable for variable speed operation include squirrel-cage induction generators, would-rotor induction generators and synchronous generators. However power converters are required for enabling variable speed control and thus they are comparatively more expensive.

A variable-speed induction generator usually pairs with a back-to-back pulse-width modulation (PWM) power converter so as to enable the same to match with the voltage and frequency of an electrical gird connected thereto. Furthermore, if a squirrel-cage induction generator (SCIG) is used, a full power converter is required; and if a wound-rotor induction generator, being also called doubly-fed induction generator (DFIG), is used, it only requires a partial power converter of usually one third power rating of a full power converter so that it is comparatively much cost-effective and thus it is the mainstream design and occupies about 70% market share of large-sized wind power generating device (wind turbine). In addition, in consideration of magnetizing current, a multi-pole structure is not suitable for the induction generators and thus it is necessary to pair the induction generator with a gearbox so that the shaft speed can be compatible with the synchronous speed of the induction generator.

For a synchronous generator used in a variable speed wind turbine, there is a future trend to adopt multi-pole permanent magnet synchronous generators (PMSG) for reducing copper loss. As the PMSG can be easily adapted for a gearless design that the drive train can be simplified and thus the energy conversion efficiency is enhanced. However for the large sized wind turbines, since most PMSGs are custom-made and each requires to be paired with a full power converter, it is still very expensive.

From the above description relating to the performance of DFIG and PMSG, there pros and cons can be summed up as following:

Regarding to the doubly-fed induction generator (DFIG):
(1) Since it requires a gearbox for speed increasing and its rotor needs to be configured with slip rings, regular maintenance is necessitated.
(2) As its practical slip is in the range of ±30%, the cut-in speed of a wind-turbine applying the same is limited by its positive maximum slip.
(3) As it adopts a partial power converter and its stators is connected to an electrical grid that causes the decoupling from the electrical grid to be impossible when the wind power generating device (wind turbine) is operating, the wind power generating device (wind turbine) can not maintain it normal operation when the electrical gird is subjected to a sudden voltage dip. Hence, it is difficult to abide by the transmission system operator's request to maintain the wind power generating device (wind turbine) on the grid and output the reactive power for assisting the voltage recovery during a faulted condition.
(4) As the magnetizing current required thereby is supplied by the grid, it is not a stand along device that can operate independently at a remote area, such as an isolated island.

Regarding to the synchronous generator (SG):
(1) Since it can fit to a gearless design, it is possible that the gearbox maintenance is not required, so that it is more reliable. However, as the gearless design will cause a larger torque on the generator that its diameter is comparatively larger, a high power synchronous generator is bulky and thus not easy for transportation and installation.
(2) As it is supported by a full power converter and its rotation speed can be controlled more widely, the wind power generating device (wind turbine) using the same can feature a lower cut-in speed.
(3) As it is supported by a full power converter so that the wind power generating device (wind turbine) using the same can be decoupled from the electrical grid connected thereto, the wind power generating device (wind turbine) is capable of maintaining its normal operation even when the electrical grid is suffering a sudden voltage dip. Hence, it is feasible to abide by the transmission system operator's request to maintain the wind power generating device (wind turbine) on the grid and output the reactive power for assisting the voltage recovery during a faulted condition.
(4) Since it can generate electricity independent of the condition of the grid when the rotor is being driven by the wind, it can be a stand along device that is suitable to operate independently at a remote area, such as an isolated island.

From the above description, it is noted that the DFIG is inferior comparing to the SG in the respect of fully decoupling with the grid. However, comparing to DFIG, the SG is more expensive and bulky.

Currently, most wind power generating devices (wind turbines) only utilize a single generator, thus the performance of the wind power generating device (wind turbine) is restricted by the characteristics of that single generator as stated above and can not be improved by integrating such generator with advantageous characteristics of other generators. For those wind power generating devices (wind turbines) with multiple generators, the design idea is either to adopt a big-small pair for fitting to different wind speed conditions, or to use a plurality of generators of same but smaller rated power to obtain a bigger resultant power so that the benefits of more cost effectiveness and redundancy can be secured.

Figure 1:
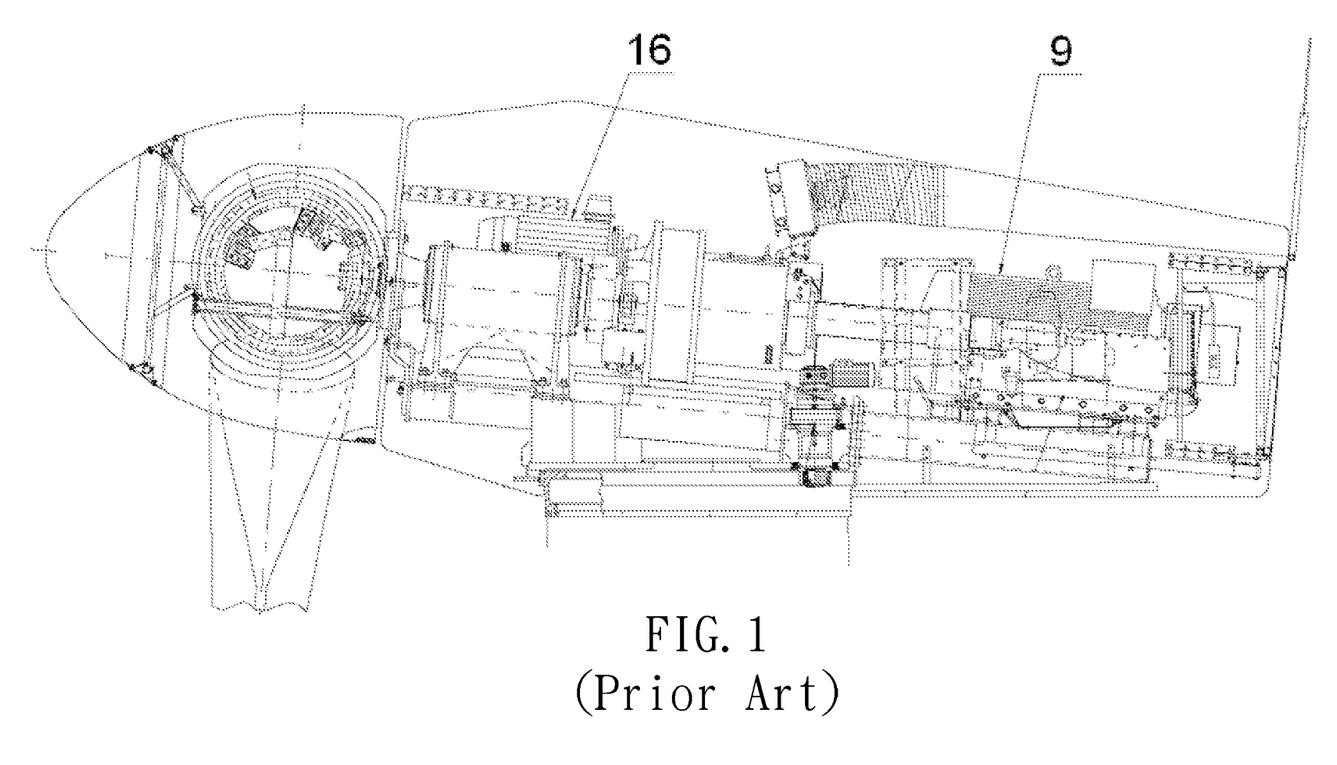
FIG. 1 shows a conventional wind power generating device (wind turbine) with multiple generators.
Figure 2:
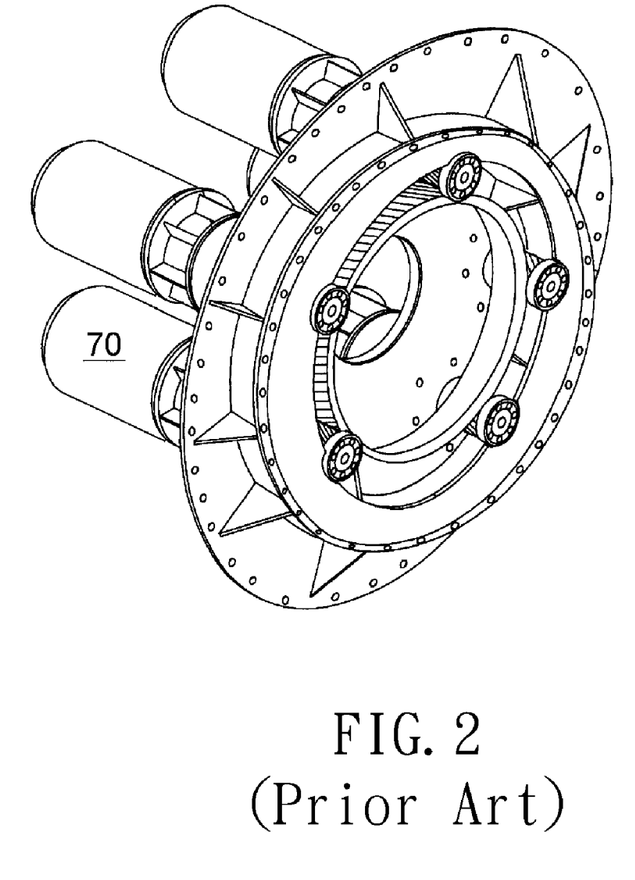
FIG. 2 shows another conventional wind power generating device (wind turbine) with multiple generators.

To name a few such wind power generating device (wind turbine)s with multiple generators, the V47-660 kW of Vestas, Denmark, and the Liberty-2.5 MW of Clipper, U.S.A. can be the representatives. The V47-660 kW of Vestas is structured as the one shown in FIG. 1, which is a conventional fixed speed wind power generating device (wind turbine), being primarily comprised of: a primary electrical generator 9 and an auxiliary electrical generator 16. As the rated power of the auxiliary electrical generator is defined to be smaller than that of the primary electrical generator, the operation principle of the wind power generating device (wind turbine) of FIG. 1 is specified as that: the auxiliary electrical generator 16 is enabled when it is subjected to a condition of low wind speed or is at its initial operating stage; and the primary electrical generator 9 is enabled when the wind speed exceeds a specific speed. Furthermore, the Liberty-2.5MW of Clipper is structured as the one shown in FIG. 2. The wind power generating device (wind turbine) of FIG. 2 adopts a design disclosed in U.S. Pat. No. 6,304,002, entitled "Distributed Powertrain for High Torque, Low Electric Power Generator", which is comprised of a plurality of small-sized electrical generators 70 of the same rated power, whereas each electrical generator 70 can be a SCIG or a PMSG. Such wind power generating device (wind turbine) not only can be handled and assembled easily, but also it has excellent redundancy. Nevertheless, those plural electrical generators used in the wind power generating device (wind turbine) are still of the same operation principle, so that the performance of the wind power generating device (wind turbine) is still restricted by the characteristics of that particular type of generator.

Figure 3:
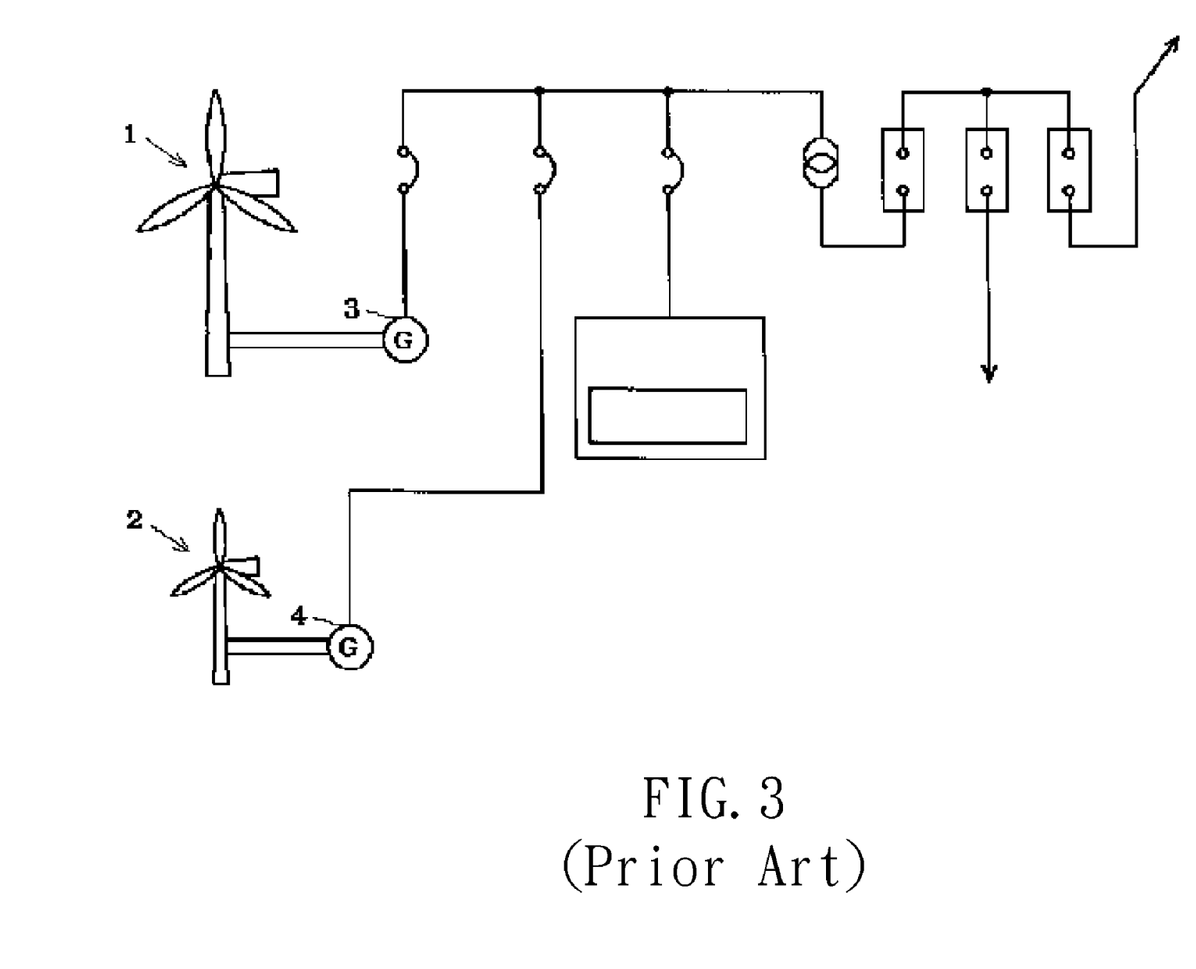
FIG. 3 shows a wind power generating facility disclosed in Japan Kokai Tokkyo Koho No. 9-60575.

Please refer to FIG. 3, which shows a wind power generating facility of Matsuo Bridge Co. Ltd., disclosed in Japan Kokai Tokkyo Koho No. 9-60575. The wind power generating facility of FIG. 3 is comprised of a primary wind turbine (unit 1) and an auxiliary wind turbine (unit 2), wherein the primary wind turbine includes a self-exciting induction generator 3 and the auxiliary wind turbine includes a synchronous generator 4. When an electrical grid connecting to the aforesaid wind power generating facility is working normally for supplying electricity, the primary wind turbine (unit 1) can acquire a magnetizing current from an electrical grid and thus feed electricity generated therefrom to the electrical grid. On the other hand, the auxiliary wind power turbine (unit 2) is enabled to provide reactive power when the electrical grid is out or the wind power generating facility is working independently. Nevertheless, since the auxiliary wind turbine (unit 2) is acting just as a backup wind turbine, so that the two wind turbines (units 1 and 2) are not being enabled simultaneously for boosting the performance of the wind power generating facility.

Figure 4:
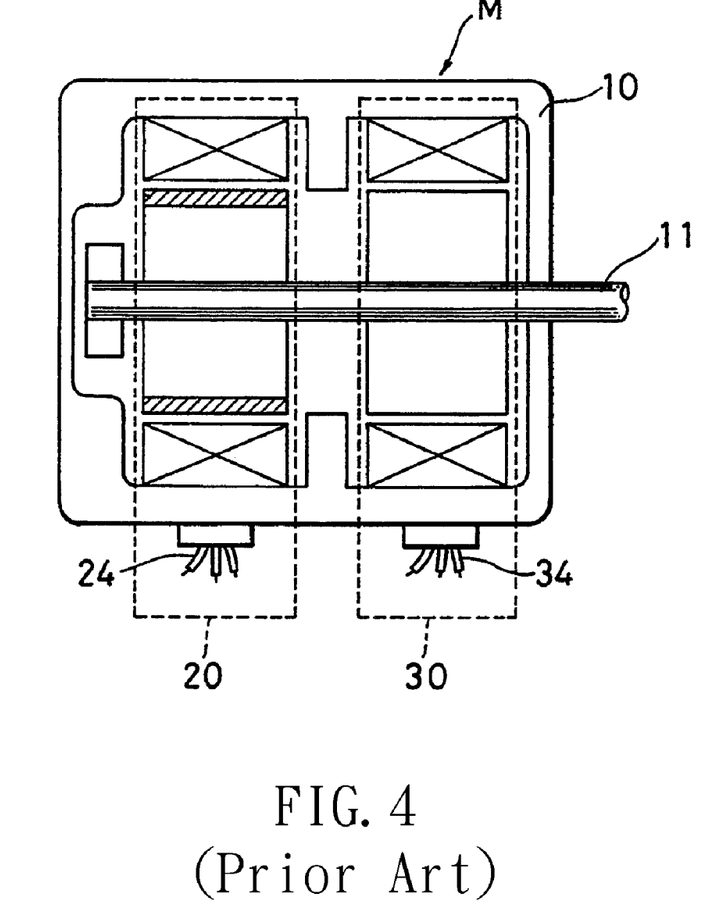
FIG. 4 is a longitudinal sectional view of an AC motor used in a variable speed driving apparatus disclosed in U.S. Pat. No. 5,365,153.
Figure 5:
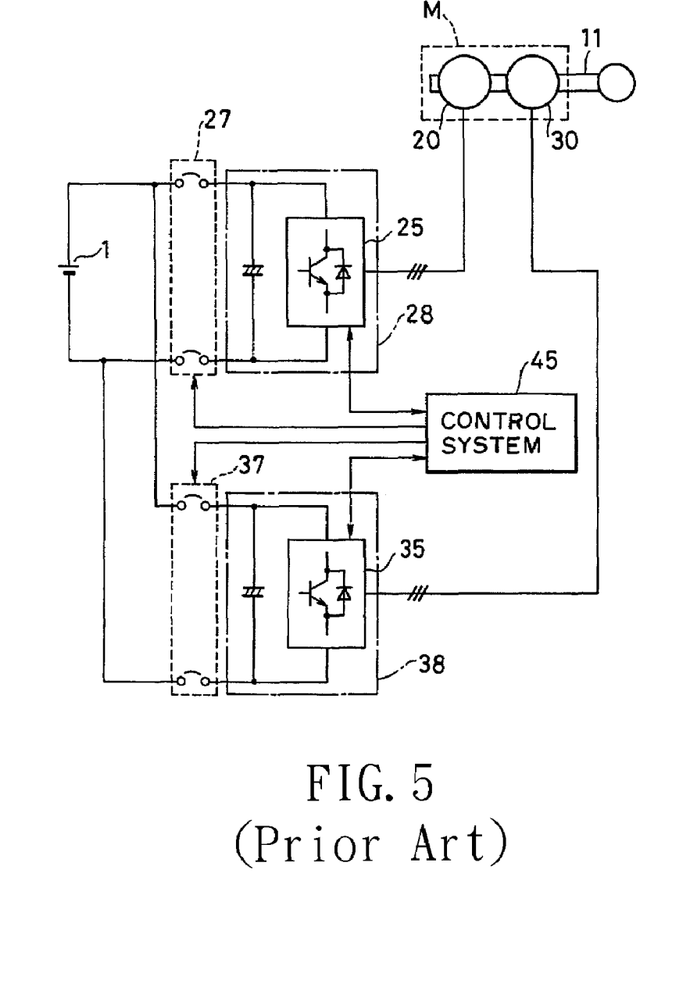
FIG. 5 is a block diagram showing a driving circuit of the AC motor of FIG. 4.

Please refer to FIG. 4 and FIG. 5, which are respectively a longitudinal sectional view of an AC motor used in a variable speed driving apparatus disclosed in U.S. Pat. No. 5,365,153, entitled "AC Variable Speed Driving Apparatus and Electric Vehicle using the same", and a block diagram showing a driving circuit of the AC motor of FIG. 4. In the AC motor M of FIG. 4, the reference numeral 10 designates a frame in which a permanent magnet synchronous motor 20 and an induction motor 30 are incorporated having a common axis of rotation 11. The permanent magnet synchronous motor 20 is connected to an inverter 28 through three phase terminals 24 while the induction motor 30 is connected to an inverter 38 through its three phase terminals 34. In the driving circuit of the AC motor M shown in FIG. 5, the main battery 1 is connected to voltage type inverters 28 and 38 through DC disconnecting switches 27 and 37, respectively, while the control system 45 is capable of detecting the status of the semiconductor device groups 25 and 35 and controlling the on/off of the two switches 27 and 37. Hence, an electric vehicle using the AC motor M can get the benefits of both the synchronous motor 20 and the induction motor 30, each operating at different rotation speed with respect to its torque output characteristic, and thus the AC motor M is considered to be highly efficient in a wide speed range. However, this patent is related to motoring mode operation of electrical machines, not generation mode.

SUMMARY OF THE INVENTION

In view of the descriptions of prior art, the primary object of the present invention is to provide a hybrid power-generating device, being provided with the benefits of two different types of electrical generators as the two are complementary to each other. In a preferred embodiment, the hybrid power-generating device integrates a doubly-fed induction generator (DFIG) and a synchronous generator (SG) while using the DFIG as its primary electrical generator and the SG as its auxiliary electrical generator as the rated power of the SG is specified to be no larger than one third of the DFIG, by which not only the overall performance of the hybrid power-generating device as well as the apparatus driven thereby are enhanced and the stability of power grid are improved, but also the operating cost thereof is reduced.

It is another object of the invention is to provide a hybrid power-generating device having a structure integrating a doubly-fed induction generator (DFIG) and a synchronous generator (SG) and a power generating method thereof, by which the characteristic of the SG that is not defined by a rotation speed range of ±30% is utilized for enabling the hybrid power-generating device to generate electricity even at a low wind speed that is not within the speed range specified by the DFIG to generate electricity. In other words, the cut-in speed of the wind power generating device (wind turbine) can be reduced for improving its annual energy production and thus the average energy production cost is reduced.

Yet, another object of the invention is to provide a hybrid power-generating device having a structure integrating a doubly-fed induction generator (DFIG) and a synchronous generator (SG) and a power generating method thereof, by which when the power converter connected to the rotors of the DFIG is exceeding its safety specification and being disabled as the electrical grid connecting to the hybrid power-generating device is subjecting to a sudden voltage dip, that is, when the DFIG is off grid and the grid can not be used for maintaining the DC bus voltage, the power converter of the SG is activated for maintaining the DC bus voltage and thus the hybrid power-generating device is able to keep generating reactive power for assisting the voltage recovery during the faulted condition.

Further, another object of the invention is to provide a hybrid power-generating device having a structure integrating a doubly-fed induction generator (DFIG) and a synchronous generator (SG) and a power generating method thereof, in which as the SG is equipped therein with an independent excitation means and, when the rotor is driven to rotate by the wind, able to generate electricity to build up the DC bus through its power converter even when the hybrid power-generating device is not connected to an electrical grid, the hybrid power-generating device is able to act as a stand along device for supplying electricity of specific voltage and frequency through its grid-side converter to the grid, and can also provide the magnetizing current for the DFIG for activating the same to generate power, so that is suitable to operate independently at a remote area, such as an isolated island.

One another object of the invention is to provide a hybrid power-generating device having a structure integrating a doubly-fed induction generator (DFIG) and a synchronous generator (SG) and a power generating method thereof, in which the rated power of the SG is selectively far smaller than that of the DFIG so as to reduce the cost for manufacturing the hybrid power-generating device since the small-sized SG can be acquired easily from various SG suppliers on the market, or by custom-made. In addition, since the rated power of the SC used in this hybrid power-generating device is relatively small, the cost of the SG as well as that of its matching power converter is also relatively cheap. Meanwhile, as the additional power provided by the SG to the hybrid power-generating device is finite, the back-to-back PMW power converter required by the SG can be selected with respect to the specification of the DFIG and thus the cost of manufacturing the hybrid power-generating device can be confined to no more than 10% increase than that of any prior-art device.

One another object of the invention is to provide a hybrid power-generating device having a structure integrating a doubly-fed induction generator (DFIG) and a synchronous generator (SG), by which when an electrical grid connected to the operating hybrid power-generating device is at faulted conditions and the wind is over the cut-in speed, the output of the SG is used as the auxiliary power of an internal control system configured in the hybrid power-generating device, such as the pitch drive system, for enabling such internal control system to function without having to rely on power fed thereto from an uninterrupted power supply (UPS) device.

One another object of the invention is to provide a hybrid power-generating device having a structure integrating a doubly-fed induction generator (DFIG) and a synchronous generator (SG), whose performance as well as its performance-to-cost ratio is better than any other wind power generating device (wind turbine) currently available. In addition, comparing the design of the hybrid power-generating device of the invention with that of one prior-art DFIG wind power generating device (wind turbine), there is only a little alteration so that the hybrid power-generating device can be considered as the retrofit of the prior-art DFIG based wind power generating device (wind turbine), and can meet the grid interconnection code.

One another object of the invention is to provide a hybrid power-generating device having a structure integrating a doubly-fed induction generator (DFIG) and a synchronous generator (SG) and a power generating method thereof, which not only can be used in a wind power system, but also is adaptable to any hydro power system, or other relating power generating systems.

To achieve the above objects, the present invention provides a hybrid power-generating device and a power generating method thereof. The hybrid power-generating device is primarily comprised of: a primary electrical generator and an auxiliary electrical generator with different characteristics, both mechanically coupled to a prime mover, for driving the same while rendering the rated power of the auxiliary electrical generator to be smaller than that of the primary electrical generator; wherein, as the prime mover, is operating at a low rotation speed at its initial operating stage, the auxiliary electrical generator is enabled to be driven and activated thereby; and as the rotation speed of the prime mover increases and reaches a predetermined value, the primary electrical generator is then being driven and activated thereby. By the aforesaid hybrid power-generating device, not only the overall performance and the stability of power grid are enhanced, but also the operating cost is reduced.

Other aspects and advantages of the present invention will become apparent from the following detailed description, taken in conjunction with the accompanying drawings, illustrating by way of example the principles of the present invention.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

Figure 6:
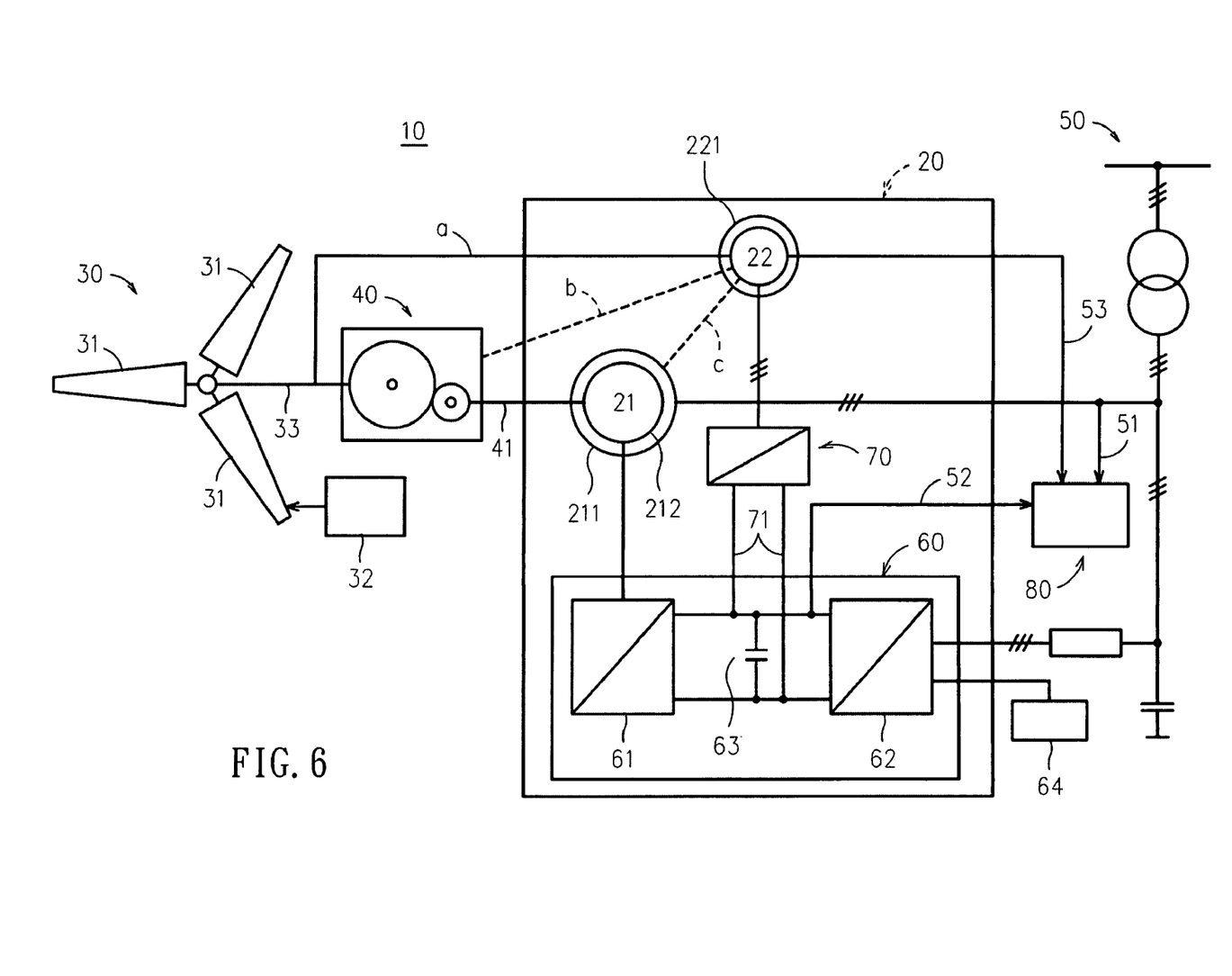
FIG. 6 shows a hybrid power-generating device according to a preferred embodiment of the invention.

Please refer to FIG. 6, which shows a hybrid power-generating device 10 with a hybrid power generator 20 according to a preferred embodiment of the invention. The hybrid power generator 20, being driven by a prime mover, is comprised of a primary electrical generator 21 and an auxiliary electrical generator 22, in which the auxiliary electrical generator 22 is coupled to the primary electrical generator 21 while rendering the rated power of the auxiliary electrical generator 22 to be smaller than that of the primary electrical generator 21. As seen in FIG. 6, the prime mover is an impeller or rotor 30 having a plurality of blades 31, in which the plural blades 31 is electrically connected to a pitch drive system, used for adjusting pitch angles of the plural blades 31. By adjusting the pitch angles of the plural blades, the amount of captured energy of a nature phenomenon, such as hydro power or wind power, can be harnessed by the impeller 30. As the aforesaid impeller 30 can be adaptively designed for harnessing many nature phenomena, such as wind and water, the hybrid power-generating device 10 with the hybrid power generator 20 of this embodiment is specified for wind power. Thus, the types of the primary electrical generator 21 and the auxiliary electrical generator 22 can be selected with respect to the wind-powered impeller 30, that the primary electrical generator 21 can be a doubly-fed induction generator (DFIG) and the auxiliary electrical generator can be a synchronous generator (SG), in which the rated power of the auxiliary electrical generator 22 should be no larger than one third that of the primary electrical generator 21 or is far less than one third of the same.

In FIG. 6, a gearbox 40 is disposed at a position between the hybrid power generator 20 and the impeller 30, that the impeller 30 is connected to the gearbox 40 by a transmission shaft 33 thereof while the gear box 40 is further connect to the hybrid power generator 20 by its transmission shaft 41. The gear box 40 is capable of transfer the power from the low speed shaft coupled to the impeller to a high speed shaft coupled to the hybrid electrical generator 20. With respect to the type of electrical generators and layout design, there can be various methods for coupling the hybrid electrical generator 20 with the impeller 30, which are listed as following:

(1) When the primary electrical generator 21 is a doubly-fed induction generator (DFIG), the DFIG is coupled to the impeller 30 through the transmission shaft 41 of the gearbox 40 so as to be driven to rotate by the impeller 30 in an indirect drive manner.

(2) When the auxiliary electrical generator 22 is a synchronous generator (SG), several coupling methods can be selected with respect to the actual power rating and cost, which are further listed as following:
  (a) coupling the auxiliary electrical generator 22 directly to the impeller 30, as indicated by the solid line a shown in FIG. 6, for enabling the same to be driven by the impeller 30 in a direct drive manner;
  (b) coupling the auxiliary electrical generator 22 to the impeller 30 through the gearbox 40, as indicated by the solid line b shown in FIG. 6, for enabling the same to be driven by the impeller 30 in an indirect drive manner;
  (c) enabling the primary and auxiliary electrical generators 21, 22 to be incorporated sharing a common driving shaft so as to couple the auxiliary electrical generator 22 to the impeller through the primary electrical generator 21 and the gearbox 40, as indicated by the solid line c shown in FIG. 6, for enabling the same to be driven by the impeller 30 in an indirect drive manner.

In another preferred embodiment, the primary and auxiliary electrical generators 212, 22 can be incorporated to connect to the gearbox 40 respectively through different output shafts of the gearbox 40, and thus being coupled to the impeller 30.

In addition, since the speed control of the hybrid power-generating device is achieved by the control of electrical generators through power converters corresponding thereto, the selection of power converters and its layout can be various according to the types of power generator adopted in the hybrid power-generating device. In FIG. 6, the primary electrical generator 21 is composed of a stator 211 and a rotor 212, whereas the stator is directly connected to an electrical grid 50 while the rotor 212 is indirectly connected to the electrical grid 50 through a back-to-back PWM-type power converter 60. The back-to-back PWM-type power converter 60 is composed of a rotor-side power converter 61, a grid-side power converter 62, and a DC bus 63. Wherein, the rotor-side power converter 61 is connected to the rotor 212 of the primary electrical generator 21; the grid-side power converter 62 is connected to the electrical grid 50; and the DC bus 63, being disposed between the rotor-side power converter 61 and the grid-side power converter 62, has a voltage matching with that of the electrical grid 50. Moreover, the stator of the auxiliary electrical generator 22 is connected to an AC/DC power converter 70 while the output 71 of the AC/DC power converter is further connected to the DC bus 63. Considering the overall performance and cost of the hybrid power-generating device, the AC/DC power converter 70 can be a uni-directional active boost converter or a bi-directional PMW-type power converter.

By the layout described above, the impeller 30, the gearbox 40, the hybrid power generator 20, the electrical grid 50, the back-to-back PWM-type power converter 60, and the AC/DC power converter 70 together forms a complete generator system. In the generator system, a power supply unit 80 is provided for supplying regulated voltage sources for the internal operation of the hybrid power-generating device 10; and a controller is for carrying out control algorithm computation and managing the operation sequence of the hybrid power-generating device 10. It is noted that since the controller and the power supply unit are known in the art, the descriptions thereof are omitted here. However, it is emphasized that the power supply unit is enabled not only to receive power from the electrical grid 50, as indicated by the arrow 51, but also form the DC bus 63 or the stator 221 of the auxiliary electrical generator 22, as indicated by the two arrows 52 and 53, so that the hybrid power-generating device 10 can maintain its normal operation even when the voltage of the electrical grid 50 is dipped suddenly.

With respect to the hybrid power-generating device 10 shown in FIG. 6, a power generating method is provided, which comprise steps of:

(a) When wind speed reach the cut-in speed that brings along the impeller 30 to rotate, the auxiliary electrical generator 22 is first being enabled to generate electricity which is fed to charge the DC bus 63 through the AC/DC power converter 70 for causing the voltage of the DC bus 63 to rise in a ramp manner. Thereafter, as soon as the voltage of the DC bus 63 reaches a specific voltage, the voltage of the DC bus 63 is switched to be controlled by the grid-side power converter 62 while switching the auxiliary electrical generator 22 to a power control mode or a torque control mode. Moreover, during the aforesaid step, the pitch angle of the blades of the impeller 30 is maintained at near 0 degree.

(b) When the rotation speed of the impeller 30 reaches a predetermined rotation speed along with the increasing wind speed, the primary electrical generator 21 with higher rate power is then being enabled to generate electricity while rendering the primary electrical generator 21 to a control mode selected from the group consisting of a power control mode and a torque control mode. Similarly, during the aforesaid step, the pitch angle of the blades of the impeller 30 is maintained at 0 degree.

To sum up, the characteristic of the present invention is that the hybrid power-generating device is configured with two electrical generators of different rated power. Thereby, a synchronous generator, used as the auxiliary electrical generator 22 that is smaller and has no minimum operation speed requirement, is first being enabled to generate electricity, and when wind speed increases and reaches a specific value, the DFIG, used as the primary electrical generator 21, is then being enabled to generate electricity. Thus, not only the overall performance and the stability of power grid are enhanced, but also the operating cost is reduced.

When the aforesaid step (a) and step (b) are completed and when the wind speed continues to increase, both the primary and the auxiliary electrical generators 21 and 22 are being enabled to operate simultaneously and therefore the hybrid power-generating device 10 is officially capable of generating electricity in its full capacity. Reaching the full-capacity power generating of the hybrid power-generating device 10, the impeller 30 is required to maintain at its rated rotation speed for stabilizing the output power of the hybrid power-generating device 10 at its rated power.

Assuming that the wind speed further increases and reaches a predetermined speed, the controller will command the pitch drive system 32 to adjust pitch angles of the plural blades 31 of the impeller 30 for reducing the wind energy that the impeller 30 can harness so as to maintain the impeller 30 to operate at the rated rotation speed and thus maintain the output power of the hybrid power-generating device 10 at its rated power. In addition, when a gust causing the impeller to rotate at a speed exceeding its rated rotation speed, a stator coil of the auxiliary electrical generator 22 can be short-circuited for a short period of time for proving an auxiliary braking torque to the impeller 30 enabling the rotation speed thereof to be reduced.

When the electrical grid 50, connecting to operating hybrid power-generating device 10, suffers a sudden voltage dip, the hybrid power-generating device 10 can help to raise the dropped voltage of the electrical grid 50 and try to maintain it at a balance condition by adopting the following steps:

(a) rendering the DC bus 63 to be controlled by the AC/DC power converter 70 while enabling the grid-side power converter 62 to generate the reactive power for assisting the voltage recovery during the faulted condition;

(b) adjusting the pitch angles of the blades 31 for decreasing captured wind energy thereby and thus reducing its power generation;

(c) enabling a controlled dump load 64 for lowering the voltage of the DC bus 63 as soon as the voltage of the DC bus 63 is detected to exceed a specific level, which might occur because the foregoing adjusting of the pitch angles is not fast enough;

(d) enabling the primary electrical generator 21 back to normal operation as soon as the voltage of the electrical grid 50 is recovered.

It is noted that the output voltage of the auxiliary electrical generator 22 can be used as an input of the power supply unit, by which the hybrid power-generating device 10 can be maintained to operate normally even when the electrical grid 50 is suffering a sudden voltage dip.

Form the above description, it is clear that as the hybrid power generator 20 has the benefits of equipping with two different types of electrical generators as the two are complementary to each other, that is, it adopts a DFIG as its primary power generator and a SG as its auxiliary electrical generator, the hybrid power generator 20 has the following advantages:

(1) As the hybrid power-generating device is equipped with a doubly-fed induction generator (DFIG) and a synchronous generator (SG) while using the DFIG as its primary power generator and the SG as its auxiliary electrical generator by specifying the rated power of the SG to be no larger than one third of the DFIG, not only the overall performance and the stability of power grid are enhanced, but also the operating cost is reduced.

(2) As the characteristic of the SG that it can generate electricity in a wider speed range other than the defined slip range of the DFIG, the cut-in speed of the wind power generating device (wind turbine) can be reduced for improving its annual energy production and thus the average energy production cost is reduced.

(3) When the power converter connected to the rotors of the DFIG is exceeding its safety specification and being disabled as the electrical grid connecting to the hybrid power-generating device is suffering a sudden voltage dip, the power converter of the SG is activated for maintaining the DC bus to keep the specific voltage and thus the hybrid power-generating device is able to generate the reactive power for assisting the voltage recovery during a faulted condition.

(4) As the SG is equipped therein with an independent excitation means and, when the rotor is driven rotating by the wind, able to generate electricity to build up the DC bus through its power converter even when the hybrid power-generating device is not connected to an electrical grid, the hybrid power-generating device is able to act as a stand along device for supplying electricity of specific voltage and frequency through its grid-side converter to the grid, and can also provide the magnetizing current for the DFIG for activating the same to generate power, so that is suitable to operate independently at a remote area, such as an isolated island.

(5) The rated power of the SG is selectively far smaller than that of the DFIG so as to reduce the cost for manufacturing the hybrid power-generating device since the small-sized SG can be acquired easily from various SG suppliers on the market, or by custom-made. In addition, since the rated power of the SG used in this hybrid power-generating device is relatively small, the cost of the SG as well as that of its matching power converter is also relatively cheap. Meanwhile, as the additional power provided by the SG to the hybrid power-generating device is finite, the back-to-back PMW power converter required by the SG can be selected with respect to the specification of the DFIG and thus the cost of manufacturing the hybrid power-generating device can be confined to no more than 10% increase than that of any prior-art device.

(6) When the electrical grid connected to the operating hybrid power-generating device is at faulted conditions and the wind is over the cut-in speed, the output of the SG is functioned as an input to the power supply unit for supplying the regulated voltage sources to the internal control system configured in the hybrid power-generating device, such as the pitch drive system, for enabling such internal control system to function without having to rely on power fed thereto from an uninterrupted power supply (UPS) device.

(7) As the output of the SG is used as the auxiliary power of an internal control system configured in the hybrid power-generating device, such as the pitch drive system, the reliability of the whole wind power generating device (wind turbine) is enhanced since such internal control system can function without having to solely rely on power fed thereto from an uninterrupted power supply (UPS) device.

(8) As the hybrid power-generating device is designed with a structure integrating a doubly-fed induction generator (DFIG) and a synchronous generator (SG), its performance as well as its performance-to-cost ratio is better than any other wind power generating device (wind turbine) currently available. In addition, comparing the design of the hybrid power-generating device of the invention with that of one prior-art DFIG based wind power generating device (wind turbine), there is only a little alteration so that the hybrid power-generating device can be considered as the retrofit of the prior-art DFIG based wind power generating device (wind turbine), and can meet the grid interconnection code.

While the preferred embodiment of the invention has been set forth for the purpose of disclosure, modifications of the disclosed embodiment of the invention as well as other embodiments thereof may occur to those skilled in the art.

Accordingly, the appended claims are intended to cover all embodiments which do not depart from the spirit and scope of the invention.

What is claimed is:

1. A hybrid power-generating device, comprising:
   a back-to-back pulse-width modulation (PWM) power converter, further comprising:
      a rotor-side power converter, connected to the primary electrical generator's rotor:
      a grid-side power converter, connected to the electrical grid;
      a DC bus, disposed at a position between the rotor-side power converter and the grid-side power converter while having a voltage corresponding to the electrical grid; and
      an AC/DC power converter, connected to the auxiliary electrical generator's stator while connecting an output terminal thereof to the DC bus;
   a hybrid power generator, each further comprising:
      a primary electrical generator; and
      an auxiliary electrical generator, having characteristics different than those of the primary electrical generator while enabling the rated power of the auxiliary electrical generator to be smaller than that of the primary electrical generator;
   and
   a prime mover, mechanically coupled to the hybrid power generator for driving the same;
   wherein, as the prime mover is operating at a low rotation speed or at its initial operating stage, the auxiliary electrical generator is enabled to be driven and activated thereby; and as the rotation speed of the prime mover increases and reaches a predetermined value, the primary electrical generator is then being driven and activated thereby.

2. The hybrid power-generating device of claim 1, wherein the rated power of the auxiliary electrical generator is not larger than one third that of the primary electrical generator for facilitating not only the enhancement of overall performance and the stability of power grid, but also the reduction of operating cost.

3. The hybrid power-generating device of claim 1, wherein the primary electrical generator is a doubly-fed induction generator (DFIG) having its stator connected to an electrical grid; and the auxiliary electrical generator is a synchronous generator (SG).

4. The hybrid power-generating device of claim 1, wherein the DC bus is connected to a controlled dump load.

5. The hybrid power-generating device of claim 1, wherein the AC/DC power converter can be a uni-directional active boost converter or a bi-directional PMW-type power converter.

6. The hybrid power-generating device of claim 1, further comprising:
   a power supply unit, for providing regulated voltage sources for internal operations of the hybrid power-generating device, being capable of receiving electrical power from multiple power sources.

7. The hybrid power-generating device of claim 6, wherein one power source of the power supply unit is the DC bus or the auxiliary electrical generator.

8. The hybrid power-generating device of claim 1, further comprising:
   a controller, used for controlling the activation of each hybrid power generator, while capable of enabling any one of the primary and auxiliary electrical generators to respectively enter a control mode selected from the group consisting of a power control mode and a torque control mode.

9. The hybrid power-generating device of claim 1, wherein the prime mover can be an impeller in a wind power, a hydro power or the like fluid power system.

10. The hybrid power-generating device of claim 1, wherein the prime mover is an impeller having a plurality of blades with adjustable pitch angles, whose output power can be varied by the adjustment of the pitch angles of its blades.

11. The hybrid power-generating device of claim 10, wherein the pitch angle of each blade is adjusted and controlled by a pitch drive system.

12. The hybrid power-generating device of claim 1, wherein a short-circuit action is incorporated as a control function applied to the stator terminals of the auxiliary electrical generator for proving an auxiliary braking torque to the prime mover.

13. The hybrid power-generating device of claim 1, wherein the primary electrical generator can be an induction generator, a synchronous generator, a direct current generator or a reluctance generator.

14. The hybrid power-generating device of claim 1, wherein the auxiliary electrical generator can be a synchronous generator or a direct current generator.

15. A power generating method for a hybrid power-generating device, comprising steps of:
   i. providing a hybrid power generator, comprising a primary electrical generator and an auxiliary electrical generator while enabling the operating characteristics of the auxiliary electrical generator to be different from those of the primary electrical generator and the rated power of the auxiliary electrical generator to be smaller than that of the primary electrical generator, and a prime mover with adjustable blades, coupled to the hybrid power generator for driving the same;
   ii. enabling the auxiliary electrical generator to be driven and activated by the prime mover as the prime mover is operating at a low rotation speed or at its initial operating stage; and
   iii. enabling the primary electrical generator to be driven and activated by the prime mover as the operating speed of the prime mover increases and reaches a predetermined value; wherein, the hybrid power-generating device further comprises a back-to-back pulse-width modulation (PWM) power converter, which comprises:
      a rotor-side power converter, connected to the primary electrical generator's rotor;
      a grid-side power converter, connected to an electrical grid; and
      a DC bus, disposed at a position between the rotor-side power converter and the grid-side power converter while having a voltage corresponding to the electrical grid;
      and wherein, as the auxiliary electrical generator being connected to the AC/DC power converter while the output of the AC/DC power converter is connected to the DC bus and is able to charge the DC bus to a predetermined voltage level, and then the voltage of the DC bus is to be controlled by the grid-side converter.

16. The power generating method of claim 15, further comprising a voltage control procedure including steps of:
   firstly using the auxiliary electrical generator though an AC/DC power converter to charge a DC bus until the DC bus reaches a predetermined voltage level; and then using a power controller to regulate the DC bus at a predetermined voltage level.

17. The power generating method of claim 16, wherein the power controller is used for controlling the activation of the hybrid power generator, while capable of enabling the primary and auxiliary electrical generators to respectively enter a control mode selected from the group consisting of a power control mode and a torque control mode.

18. The power generating method of claim 15, wherein the AC/DC power converter charges and controls the voltage of the DC bus to rise in a ramp manner.

19. The power generating method of claim 15, wherein the AC/DC power converter can be a uni-directional active boost converter or a bi-directional PMW-type power converter.

20. The power generating method of claim 15, wherein the voltage control procedure further comprises a voltage balance procedure, being executed as soon as the electrical grid suffers a sudden voltage dip being evaluated as a faulted condition for maintaining the voltage of the electrical grid at a reasonable value, including steps of:
  rendering the DC bus to be controlled by the AC/DC power converter connected to the auxiliary electrical generator while enabling the grid-side power converter to generate reactive power for assisting the voltage recovery during the faulted condition;
  adjusting the pitch angles of the blades of the prime mover for decreasing captured wind energy thereby and thus reducing power generation of the hybrid power generator;
  rendering the output voltage of the auxiliary electrical generator to be used as an input of a power supply unit for providing power to internal operations of the hybrid power-generating device, by which the hybrid power-generating device can be maintained to operate normally even when the electrical grid is at a faulted condition; and
  enabling the primary electrical generator back to normal operation as soon as the faulted condition of the electrical grid is recovered.

21. The power generating method of claim 20, the voltage balance procedure further comprising the step of:
  enabling a controlled dump load for lowering the voltage of the DC bus as soon as the voltage of the DC bus is detected to exceed a specific level, which might occur because the foregoing adjusting of the pitch angles is not fast enough.

22. The power generating method of claim 15, wherein regulated voltage sources for the internal operations of the hybrid power-generating device is provided by the power supply unit, capable of receiving electrical power from multiple power sources.

23. The power generating method of claim 22, wherein one power source of the power supply unit is the DC bus or the auxiliary electrical generator.

24. The power generating method of claim 15, wherein at step (b), as soon as the prime mover reaches a rated rotation speed, the prime mover is directed to maintain to operate at that rated rotation speed by using the pitch drive system.

25. The power generating method of claim 24, wherein a short-circuit action is incorporated as a control function applied to the stator terminals of the auxiliary electrical generator for proving an auxiliary braking torque to the prime mover.

26. The power generating method of claim 15, wherein the rated power of the auxiliary electrical generator is not larger than one third that of the primary electrical generator for facilitating not only the enhancement of overall performance and the stability of power grid, but also the reduction of operating cost.

27. The power generating method of claim 15, wherein the primary electrical generator is a doubly-fed induction generator (DFIG); and the auxiliary electrical generator is a synchronous generator (SG).

28. The power generating method of claim 24, wherein the hybrid power generator is coupled to the prime mover through a gearbox for enabling the prime mover to drive the generator in an indirect manner.

29. The power generating method of claim 28, wherein a plurality of power generators are so incorporated in the hybrid power generator by enabling those to share a common driving shaft while using the driving shaft to connect those to the gearbox.

30. The power generating method of claim 24, wherein the prime mover is coupled directly to the auxiliary electrical generator for enabling the same to be driven directly by the prime mover.

31. The power generating method of claim 24, wherein the prime mover can be an impeller in a wind power, a hydro power or the like fluid power system.

32. The power generating method of claim 31, wherein the impeller has a plurality of blades with adjustable pitch angles, whose output power can be varied by the adjustment of the pitch angles of its blades.

33. The power generating method of claim 32, wherein the pitch angle of each blade is adjusted and controlled by a pitch drive system.

34. The power generating method of claim 15, wherein the primary electrical generator can be an induction generator, a synchronous generator, a direct current generator or a reluctance generator.

35. The power generating method of claim 15, wherein the auxiliary electrical generator can be an induction generator, a synchronous generator, a direct current generator or a reluctance generator.

* * * * *